United States Patent [19]

Bastiaansen et al.

[11] Patent Number: 4,938,911

[45] Date of Patent: Jul. 3, 1990

[54] PROCESS FOR PREPARING POLYOLEFIN GEL ARTICLES AS WELL AS FOR PREPARING HEREFROM ARTICLES HAVING A HIGH TENSILE STRENGTH AND MODULUS

[75] Inventors: Cornelis W. M. Bastiaansen, Geleen; Henricus E. H. Meijer, Born; Pieter J. Lemstra, Brunssum, all of Netherlands

[73] Assignee: Stamicarbon B.V., Geleen, Netherlands

[21] Appl. No.: 268,919

[22] Filed: Nov. 9, 1988

Related U.S. Application Data

[63] Continuation-in-part of Ser. No. 173,022, Mar. 23, 1988, abandoned, which is a continuation of Ser. No. 13,181, Feb. 9, 1987, abandoned, which is a continuation of Ser. No. 830,936, Feb. 19, 1986, abandoned.

[30] Foreign Application Priority Data

Feb. 20, 1985 [NL] Netherlands .......................... 8500477

[51] Int. Cl.$^5$ .......................... B29B 15/00; D01F 6/04
[52] U.S. Cl. .................................. 264/56; 264/178 R; 264/205; 264/210.1; 264/211.18; 264/211.2; 264/211.21; 264/237; 264/289.3; 264/289.6; 264/319; 264/343; 264/348
[58] Field of Search ...................... 264/103, 205, 210.8, 264/343, 56, 178 R, 210.1, 211.18, 211.2, 211.21, 237, 289.3, 289.6, 319, 348; 528/480, 483, 491, 497, 498

[56] References Cited

U.S. PATENT DOCUMENTS

| 3,515,567 | 6/1970 | Toni et al. | 427/307 |
|---|---|---|---|
| 3,850,667 | 11/1974 | Toni et al. | 117/36.7 |
| 4,344,908 | 8/1982 | Smith et al. | 264/203 |
| 4,411,854 | 10/1983 | Maurer et al. | 264/205 |
| 4,422,993 | 12/1983 | Smith et al. | 264/210.8 |
| 4,430,383 | 2/1984 | Smith et al. | 264/210.8 |
| 4,436,688 | 3/1984 | Koschinek et al. | 264/176 F |
| 4,436,689 | 3/1984 | Smith et al. | 264/210.8 |
| 4,536,536 | 8/1985 | Kavesh | 524/462 |
| 4,551,296 | 11/1985 | Kavesh | 264/177 F |

FOREIGN PATENT DOCUMENTS

| 048227 | 3/1982 | European Pat. Off. . |
| 055001 | 6/1982 | European Pat. Off. . |
| 064167 | 11/1982 | European Pat. Off. . |
| 077590 | 4/1983 | European Pat. Off. . |
| 2051667 | 1/1981 | United Kingdom . |

Primary Examiner—Hubert C. Lorin
Attorney, Agent, or Firm—Cushman, Darby & Cushman

[57] ABSTRACT

A process is described for the preparation of highly stretchable high-molecular weight polyolefin gel articles and polyolefin gel articles prepared therefrom having combined high tensile strength and high modulus, wherein an initial shaped article of the polyolefin is exposed to or contacted with a swelling agent to form an intermediate swollen article, which is then converted to the gel state and then subsequently subjected to stretching at up to relatively high draw ratios.

11 Claims, No Drawings

PROCESS FOR PREPARING POLYOLEFIN GEL ARTICLES AS WELL AS FOR PREPARING HEREFROM ARTICLES HAVING A HIGH TENSILE STRENGTH AND MODULUS

RELATED APPLICATIONS

This is a continuation-in-part of U.S. application Ser. No. 07/173,022 filed Mar. 23, 1988, now abandoned, which is a continuation of U.S. application Ser. No. 07/013,181 filed Feb. 9, 1987, now abandoned, which is a continuation of U.S. application No. 06/830,936 filed Feb. 19, 1986, now abandoned, the disclosures of which are incorporated herein by reference.

FIELD OF THE INVENTION

This invention relates to a process for preparing highly stretchable gel articles formed of high-molecular weight polyolefins, and to a process for preparing articles having a high tensile strength and modulus from such polyolefin gel articles.

BACKGROUND OF THE INVENTION

It is known in the art to prepare articles, particularly filaments and ribbons, having a high tensile strength and modulus, starting from solutions of high-molecular weight polymers, particularly high-molecular weight linear polyethylene. See, for instance, U.S. Pat. Nos. 4,344,908, 4,422,993, 4,430,383, 4,411,854 and 4,436,689. In these known processes, a solution of mostly below 30% by weight of a high-molecular weight polymer, particularly polyethylene, is passed through a round or slit-shaped spinning aperture at an elevated temperature to produce a filament or ribbon. The solution spun as a filament or ribbon solution is subsequently transformed into a gel filament or gel ribbon by cooling, after which it is stretched at an elevated temperature, either with or without removal of all or part of the solvent.

These known processes start from relatively dilute polymer solutions because it has been found that the stretchability and the final modulus and tensile strength of the articles are higher when the initial concentration of the polymer solution is lower.

A disadvantage is, however, that it is necessary in these processes to prepare a dilute homogeneous polymer solution to form the product, which is known to be costly in the manufacture of these products. In fact, a substantial portion of the plant manufacturing process costs for the production of articles starting from a polymer solution containing a large quantity of solvent is for the handling of the solvent. In particular, the processing equipment suitable for and required to accommodate the solvent handling is a major capital cost factor.

A further disadvantage of these dilute solution processes is that the rate of production is determined by the rate of spinning or extrusion, and this in turn is affected by the concentration of the solution.

SUMMARY OF THE INVENTION

In accordance with the present process, a highly stretchable gel article is obtained by contacting a spun or extruded initial shaped article of the high molecular weight polymer with a swelling agent to produce a swollen article which contains from about 60% to about 99% by weight of the swelling agent. Thereafter, the swollen article is cooled and stretched to form a final product article having good properties of modulus and tensile strength. Furthermore, the present process can even be carried out using initial shaped articles composed of 100% polyolefin, thereby obviating the problems associated with manufacturing such articles from dilute polymer solutions.

The present invention thus provides a process for preparing highly stretchable gel articles from high-molecular weight polyolefins. In another aspect, the invention provides a process for preparing final articles having a high tensile strength and modulus from such polyolefin gel articles.

More specifically, the invention in one aspect relates to a process for preparing highly stretchable gel articles which comprises contacting an initial shaped article comprising a polyolefin, having a weight-average molecular weight of at least $4 \times 10^5$, with a swelling agent therefor to produce a swollen article containing from about 60% to about 99% by weight of said swelling agent. The initial shaped article is contacted with the swelling agent at a temperature above the dissolving temperature of the polyolefin and below the temperature at which the polyolefin and/or the swelling agent decompose and for a length of time (t), expressed in minutes, wherein t is between about $0.1D^2$ and about $100D^2$, where D represents the thickness, or diameter, of the article in millimeters. Said swollen article is then cooled to a temperature below the gelling temperature of the polyolefin to produce the gel article.

In a further aspect, the invention relates to a process of stretching or drawing at elevated temperatures the thus-produced gel articles to prepare polyolefin articles having a high tensile strength and modulus.

DETAILED DESCRIPTION OF THE PREFERRED EMBODIMENTS

The initial polyolefin articles used in the present processes may be any shaped, generally spun or extruded, article, including filaments, fibers, ribbons, tapes, films, tubes, profiles or rods. The articles may be hollow or solid and may contain solvent.

Such initial shaped articles may be obtained by a variety of known methods. For example, a finely divided solid polyolefin may be transformed in a kneader, particularly an extruder, into a shaped article, such as a fiber, tape, film, rod, etc. Other suitable methods include the transformation of a solid polyolefin into a shaped article via a pressure forming or a sintering process. It is also possible to use melted pololefins, which do not have an ultra-high molecular weight and which are extruded into initial shaped articles.

Also suitable is an article composed of a solvent-liberated gel prepared by a thermoreversible gelling process. Such a gel can be obtained by converting at elevated temperature a solution of a high-molecular weight polyolefin into a solvent-containing article. This article is then converted into a gel article by rapid cooling followed by substantial liberation of the solvent from the gel article. An extra advantage in this mode of practicing the present invention is that it provides the possibility of great flexibility in selecting the solvents employed. For instance, the solvent selected as most suitable for the initial shaping process can be employed and then subsequently replaced by a swelling agent selected as more suitable for the preparation of the highly stretchable gel and/or stretched final product.

Although initial shaped (extruded) articles made of 100% polyolefin may be used in the process of the instant invention, it is most desirable to use an initial shaped polyolefin article containing solvent. The amount of solvent contained in the article may typically range from about 40% to about 90% by weight. When the article is made from an ultra-high-molecular weight polyolefin, such as higher than $3 \times 10^6$, and especially above $6 \times 10^6$, such an article will desirably contain about 60% to about 90% by weight of the solvent and more preferably about 80% to about 95% solvent.

The initial solvent-containing article may be obtained by converting a high-molecular weight polyolefin suspension in a solvent into a homogeneous solution, at an elevated temperature, followed by shaping the solution into the desired configuration, such as a rod, e.g., by spinning or extrusion. This conversion process may be conducted by using a screw extruder having conveying and kneading means. Preferably, the extruder will be a co-rotating twinscrew extruder, which usually mixes and kneads the suspension at a speed of about 30 to 300 rpm, thereby transforming the suspension into a solution within about 0.5–45 minutes at mechanical shear rates of about 5 to about 2000 $\sec^{-1}$. Typically, the resulting solution is then converted into the initial shaped article by using a profiled extrusion head, wherein a gear pump is incorporated between the extruder and the head.

Various known solvents can be used to prepare the solvent-containing initial shaped articles. Suitable solvents include aliphatic, cyclo-aliphatic and aromatic hydrocarbons with boiling points of at least 100° C. More specifically, suitable solvents include $C_9$–$C_{12}$ alkanes, paraffins, paraffin waxes, toluene, xylenes, tetraline, decalin, petroleum fractions, and halogenated hydrocarbons, such as trichlorobenzene. Lower cost non-substituted hydrocarbons, including hydrogenated derivatives of aromatic hydrocarbons, may be preferred for economic reasons.

The initial shaped article may be formed of any polyolefin, particularly including polypropylene and polyethylene. A suitable polypropylene has a high molecular weight, in particular more than $5 \times 10^5$. Preferably, the polyolefin is a linear polyethylene with a weight-average molecular weight of at least $4 \times 10^5$, more desirably at least $8 \times 10^5$. As used herein, high-molecular weight linear polyethylene means polyethylene which may be copolymerized with minor amounts of 5 mole % at most, of one or more other alkenes, such as propylene, butylene, pentene, hexene, 4-methylpentene, octene, and the like. Polyethylene copolymerized as such has an average of less than 1 side chain per 100 carbon atoms and preferably less than 1 side chain per 300 carbon atoms. Additionally, the polyethylene may have blended therewith minor amounts, preferably at most 25% by weight, of one or more other polymers, including an alkene-1-polymer, such as polypropylene or polybutylene, or a copolymer of propylene with a minor quantity of ethylene.

The polyethylene may optionally contain substantial amounts of fillers such as are described in U.S. Pat. No. 4,411,854. It may also be an advantage to use a polyethylene in which the weight-average to number-average molecular weight ratio is less than 5, as described in U.S. Pat. No. 4,436,689.

As the molecular weight of the polyethylene increases, the viscosity of the solution will also increase and as a result the solution becomes more difficult to process. For this reason, polyethylene with a molecular weight higher than about $25 \times 10^6$ will not generally be used, even though the present process is feasible with such higher molecular weights.

The weight-average molecular weights referred to herein can be determined according to known methods of gel permeation chromatography or light scattering.

Suitable swelling agents include the lower alkane gases, such as butane, pentane, and heptane but preferably a liquid is used. Typically, the liquid swelling agent is one having a Flory-Huggins interaction parameter, the so-called Chi value, between polyolefin and liquid of less than about 0.5. A discussion and definition of the Chi value parameter can be found in 'Principles of Polymer Chemistry' by P. J. Flory, Cornell University Press, Ithaca, N.Y., 1953. Moreover, the liquid will desirably have a relatively high diffusion coefficient. Examples of suitable liquid swelling agents for use in this invention particularly include decalin, xylene, tetralin, and trichlorobenzene.

Contact of the initial shaped polyolefin article with the swelling agent may be achieved by a variety of methods. If the swelling agent is a gas, then it is sufficient if the article is simply introduced into an environment containing the gas, whether it is completely vaporized or only partly vaporized at the temperature employed. Preferably, the swelling agent is a liquid contained in a bath into which the article is introduced.

The time duration for contacting the article with the swelling agent may vary and will depend upon a variety of factors, including the amount of solvent in the article, the article's composition and shape, the temperature of the bath, the nature and temperature of the swelling agent, and the desired amount of swelling agent to be taken up. Generally, the initial shaped article is contacted with the swelling agent for a sufficient length of time that the swollen article contains from about 60% to about 99% by weight of the swelling agent.

Surprisingly, it has been found that generally a very substantial take-up of swelling agent occurs in a very short time. For example, the time required for the swelling of hot solvent-containing articles is usually only a few seconds and only a fraction of a second for the thinner articles. Generally, it may be stated that, depending on the thickness or diameter (D) of the article in millimeters, this required time (t) is between $0.1D^2$ and $100D^2$ minutes. Generally, with fibers, tapes and films a swelling time of from 0.01 to 10 minutes, preferably from 0.1 to 5 minutes, will suffice.

It has been found that in general the degree of stretchability of the gel article increases as increased amounts of swelling agent are taken up by it. Since it is desirable to produce gel articles with a very high stretchability, it is accordingly desirable to produce a swollen article containing a relatively high percentage of swelling agent. Generally, the amount of swelling agent contained in the swollen polyolefin gel article will range from about 60% to about 99% by weight, preferably from about 75% to about 95% and most preferred is a range of about 85% to about 95%. When preparing articles from polyolefins with an ultra-high molecular weight, for instance, of more than $3 \times 10^6$, and especially more than $6 \times 10^6$, a swollen article containing about 95% to about 99% by weight swelling agent is preferred, so as to provide good stretchability.

According to the invention, the initial shaped polyolefin article is contacted with the swelling agent at a temperature above the dissolving temperature of the polyolefin. However, this temperature must not be so high as to result in substantial thermal decomposition of the polyolefin and/or the swelling agent. Further, this temperature is typically below the boiling point of the swelling agent. Thus, the temperature to be employed depends in part on the polyolefin and the swelling agent used. Generally, the temperature will be selected between about 75° C. and about 200° C., advantageously between about 100° C. and about 180° C.

It may be an advantage to prestretch the extruded shaped polyolefin (solution) article prior to contact with the swelling agent, either hot or cold, so that the dimension D, which determines the swelling time, is lowered. Surprisingly it has been found that the otherwise negative aspects inherent in pre-stretching are absent from the point of view of the overall stretching process, because in the swelling process the proceeding history of the article is eliminated.

A very great advantage, particularly in the manufacture of fibers, is that in this process prior limitations on the rate of production and titre diameter are eliminated.

According to the invention the swollen article is cooled below the gelling temperature. While this temperature depends on the concentration and nature of the polyolefin and on the swelling agent employed, it is generally between about 75° C. to 95° C. This cooling can be effected by, for instance, contacting the article with a very cold cooling surface, or by contacting the article with a cold gaseous medium, such as air or nitrogen. Preference is given to effecting the cooling by quenching the article in a liquid medium. To this end a liquid medium may be used in which the polyolefin and the swelling agent employed will hardly dissolve, such as water. It is also possible to use a liquid medium in which the polymer is slightly soluble while the swelling agent is reasonably or very soluble or miscible therein. In this last-mentioned mode of realization a process of extraction of the swelling agent also takes place simultaneously with and in addition to the cooling. Examples of such suitable liquid media include trichloroethylene, dichloromethane, methanol or trichlorotrifluoroethane.

The gel article which is obtained after the cooling step can be subsequently transformed by stretching into a product article having a high tensile strength and modulus. The stretching step may be accomplished in either one step or in a series of steps. The later stretching process generally enhances the draw ratio, particularly when conducted over a range of increasing temperature. Any residual swelling agent may be removed, for instance by evaporation or by extraction, in whole or in part, before the stretching. However, it is also possible to stretch a gel article still containing substantial amounts of swelling agent.

Since the final product article must be free of swelling agent, any residual swelling agent can be separated from the article during the stretching process which can be easily accomplished by various methods, such as by passing a hot gas or air stream along the article in the stretching zone so as to vaporize and remove the swelling agent, or by stretching the article in a liquid bath comprising an extractant for the swelling agent. The extractant may optionally be the same as the swelling agent.

Hollow and solid shaped articles may be given shape—after removal of the swelling agent—by stretching and simultaneous calibration of the dimensions.

It is preferable to stretch or draw the gel articles at elevated temperatures, particularly above 75° C., but below the melting point or solution point of the polyolefin. If the temperature goes above the polyolefin melting point, then the mobility of the macro-molecules will tend to become so high that the desired degree of orientation achieved will be insufficient. The intramolecular generation of heat resulting from the stretching of the articles must here be taken into account. At high rates of stretching the temperature in the articles may thus show a strong rise and care must be taken that it does not get near or beyond the melting point.

The articles can be brought up to the stretching temperature by introducing them into a zone with a gaseous or liquid medium, which is maintained at the desired temperature(s). A tubular oven with air as the gaseous medium is very suitable, but a liquid bath or any other appropriate device can also be used. The temperature need not be the same throughout the stretching zone.

If so desired, minor amounts of common additives, stabilizers, fiber-treating agents and the like can be incorporated into or onto the articles, specifically amounts of 0.1–10% by weight in respect of the polyolefin.

The moduli (E) and tensile strengths ($\sigma$) of the product articles are calculated by means of stress-strain curves as determined at room temperature with an Instron Tensile Tester, at a testing speed of 10% per minute and reduced to the original diameter of the sample. The stretching of the articles may be uniaxial, biaxial, as well as multiaxial. In uniaxial stretching, high draw ratios, for instance above 10, can be utilized. With fibers and tapes, ultra-high draw ratios, higher than 20, are customary. It may be an advantage for the gel product to be subjected to irradiation, particularly electron irradiation, before or during the stretching, which will typically reduce the creep and the fibrillation of the product.

From the above discussion, it will be appreciated that the process of this invention provides a substantial advantage over prior techniques in which either 100% polyolefin was spun or extruded, or a very dilute polyolefin solutions were extruded.

This happens because by practice of the present process a more concentrated high molecular weight polyolefin solution may be extruded. This means that less solvent initially has to be mixed in with the polyolefin. Since less solvent is initially mixed in, the volume of the processing equipment may be made smaller—particularly with respect to the most expensive component parts of the plant, e.g., the twin screw extruder, tanks, stirring, and suspension-forming equipment.

The final products according to the invention are suitable for many uses. The filaments and tapes obtained herein, can be used for reinforcement of many materials and for all uses wherein a low weight combined with a high strength is desirable, such as, for instance, rope, nets, filter cloths, fabrics, magnetic tapes.

The films according to the invention are suitable for many applications. They can be cut to form strong bands, ribbons or tapes. They can be used as reinforcement in many materials that are known to be reinforced with films or ribbons and for all applications in which a low weight combined with great strength is desirable, such as, for instance, audiovisual or magnetic tapes, tapes for medical uses, packaging films, protective sheeting, substrates for adhesives or insulating films in condensers.

The invention is further elucidated in the following examples without, however, being limited thereto.

EXAMPLE A (comparative example)

A high-molecular weight polyethylene of the Hizex-240 M grade (Mitsui Petrochemicals) having a weight-average molecular weight $M_w$ of about $1.9 \times 10^6$ ($\eta$ decalin' 135° C.=15.5: Fliesswert $N/mm^2 = 0.30$) was suspended in decalin to a nominal concentration of 30% (wt) at room temperature. After deration and washing with nitrogen and addition of a stabilizer composition, the suspension was fed to an extruder while being stirred continuously (in order to prevent settlement). A twin-screw co-rotating extruder of the ZSK type of the film of Werner and Pfleiderer was selected; L/D=27. It was provided with 2×30 mm screws composed of alternating conveying and kneading elements. The suspension was supplied at room temperature to the feeding zone, the thermostat temperature was set at about 80° C. The suspension of polyethylene in decalin was extruded at about 180° C. (head temperature) at a speed of 200 rpm. With a gear pump a residence time of about 6 minutes was created in the extruder.

Under the above conditions, the process produced a clear solution free of suspended particles, having a constant composition and concentration.

Via an aperture (diameter 1 mm) the mixture was carried off from the extruder at a temperature of about 160° C., upon which the solvent-containing filaments were quenched in a water bath and subsequently passed through a bath containing trichloroethylene for the extraction of decalin. The filaments were subsequently stretched via a two-step process, first in an oven at a temperature between 90°–120° C. and subsequently on a hot plate with a temperature gradient between 135° and 150° C.

The total draw ratio was 19 and the filament titre 410 and 410 dtex/filament, the E modulus was 18 GPa and the tensile strength ($\sigma$) was 0.55 GPa.

COMPARATIVE EXAMPLE B

The process of example A was repeated, but the solvent-containing fibre was first pre-stretched about 10× and subsequently quenched. The subsequent draw ratio was now 16, the filament titre was 32 dtex/filament, the E modulus was about 20 GPa and the tensile strength ($\sigma$) was about 0.6 GPa.

It is clear from Examples A and B that is is practically impossible via the known processes (thermoreversible gelling), and starting from polyolefin solutions of a relatively high concentration, to prepare fibers with a really desirable combined high strength and modulus, even when a process of pre-stretching is used.

EXAMPLE I

The process of example A was repeated, but this time the solvent-containing filaments obtained from the extruder were first passed through a decalin bath of a temperature of 160° C. before quenching. The residence time in the bath was about 1.1 minutes resulting in swollen filaments. The swollen filaments were then converted via quenching, extraction and two-step stretching (total draw ratio 55) to produce filaments having the following properties:
  filament titre=150 dtex/filament
  E-modulus=75 GPa
  strength ($\sigma$)=2.2 GPa.

EXAMPLE II

The process of example I was repeated, but now the applied residence time in the swelling bath was about 2.5 minutes. With a total draw ratio of 95, product filaments were obtained having the following properties:
  filament titre=90 dtex/filament
  E-modulus=110 GPa
  strength ($\sigma$)=2.9 GPa.

EXAMPLE III

The process of example B was repeated but the pre-stretched dry filaments obtained after extraction were subjected for 30 seconds to a swelling process in decalin (150° C.) in the manner described in Example I.

With a subsequent draw ratio of 75, product filaments were then obtained having the following properties:
  filament titre=18 dtex/filament
  E-modulus=85 GPa
  strength ($\sigma$)=2.4 GPa.

EXAMPLE IV

The process of example III was repeated, but now with a residence time of 45 seconds in the decalin bath. Subsequent stretching with a draw ratio of about 90 resulted in product filaments having the following properties:
  filament titre=13 dtex/filament
  E-modulus=110 GPa
  strength ($\sigma$)=3.3 GPa.

It will be seen from the foregoing examples that using the swelling procedure of this invention, consistently higher modulus and tensible strength values were obtained.

COMPARATIVE EXAMPLE C

The process of example A was repeated except that 10% by weight solution of polymer in decalin was prepared and fed into the extruder. Using a total draw ratio of 39, the products obtained from this process have the following properties:
  filament titre=62 dtex/filament
  E-modulus=80 GPa
  strength ($\sigma$)=1.8 GPa.

EXAMPLE V

The process of example C was repeated but, as described in example I, the filaments from the extruder were first subjected for 21 seconds to a swelling process in decalin. A total draw ratio of 94 could now be used and products obtained in this process had the following properties:
  filament titre=19 dtex/filament
  E-modulus=120 GPa
  strength ($\sigma$)=3.0 GPa.

EXAMPLE VI

The process of example V was repeated except that the initial filament obtained from the extruder was pre-stretched about 10× and a swelling time of 2.5 seconds was applied. Subsequent stretching at a draw ratio of about 70 produced filament products having the following properties:
  filament titre=3 dtex/filament
  E-modulus=120 GPa
  strength ($\sigma$)=3.3 GPa.

EXAMPLE VII

A high-modulus polyethylene of the Hostalen GUR-412 grade (Ruhrchemie/Hoechst) with a weight-average molecular weight of about $1.5 \times 10^6$ ($\eta$ decalin, 135° C.=15; Fliesswert=0.24 N/mm$^2$) was pressure-formed for 0.5 hour at 200° C. and 800 bar to form a sheet of a thickness of 0.5 mm.

The resulting sheet was subjected to swelling in a xylene bath (temperature 120° C.) for 15 minutes, subsequently cooled in air and successively dried.

The resulting gel sheet was then cut to form tapes, which were stretched with a draw ratio of 45× at 110° C., yielding product tapes having an E-modulus of 110 GPa.

EXAMPLE VIII

In the manner described in example VII, a Hizex-240 M grade polyethylene was pressure-formed to form a sheet, which was subjected to a swelling process in a decalin bath (160° C.) for 10 minutes and subsequently cooled, dried and cut to form tapes.

The resulting gel tapes were stretched with a total draw ratio of 50 in two steps at a temperature gradient of 120°-140° C., yielding product tapes having an E-modulus of 130 GPa.

EXAMPLE IX

A series of 54 additional experiments were carried out under the conditions set forth in the following Tables A and B. Polyethylene was used with the indicated molecular weights. Experiments 1–46 deal with extruded film, whereas Experiments 47–54 deal with extruded filaments. In this example, the odd-numbered experiments were subjected to a one-step drawing, and the even-numbered experiments used a multi-step drawing (Exp. 2 corresponds to Exp. 1, Exp. 4 corresponds to Exp. 3, etc.)

The consistently high combined modulus and tensile strength values obtained were set forth in the Tables.

| Experimental Conditions | | | | | | One-Step Drawing (Odd Numbered Experiments) | | | Multi-step Drawing (Even-No./ Experiments) | | | Experiment |
|---|---|---|---|---|---|---|---|---|---|---|---|---|
| d mm | $D_1$ | $D_2$ | ts [min] | Ts [°C.] | Solvent* | Mw gr·mol$^{-1}$ | $g_1$ | $E_1$ [GPa] | st$_1$ [GPa] | $g_2$ | $E_2$ [GPa] | st$_2$ [GPa] | Number |
| TABLE A OF EXAMPLE IX (Experiments 1–34) (ALL WITHOUT DRAWDOWN) | | | | | | | | | | | | | |
| 1.1 | 100 | 50 | 2 | 150 | dec | $0.8 \times 10^6$ | 14 | 30 | 0.4 | 30 | 60 | 1.3 | |
| 1.1 | 100 | 25 | 8 | 150 | dec | $0.8 \times 10^6$ | 20 | 43 | 0.8 | 42 | 80 | 2.0 | 1–6 |
| 1.1 | 100 | 13 | 18 | 150 | dec | $0.8 \times 10^6$ | 28 | 60 | 1.2 | 60 | 105 | 2.4 | |
| 1.1 | 100 | 52 | 2 | 150 | dec | $2 \times 10^6$ | 6 | 15 | 0.4 | 12 | 20 | 0.7 | |
| 1.1 | 100 | 25 | 8 | 150 | dec | $2 \times 10^6$ | 10 | 23 | 0.6 | 23 | 46 | 1.5 | 7–12 |
| 1.1 | 100 | 14 | 17 | 150 | dec | $2 \times 10^6$ | 20 | 46 | 1.5 | 41 | 80 | 2.5 | |
| 1.1 | 100 | 51 | 2 | 150 | dec | $5 \times 10^6$ | 4 | 10 | 0.6 | 9 | 20 | 0.7 | |
| 1.1 | 100 | 25 | 8 | 150 | dec | $5 \times 10^6$ | 7 | 15 | 0.7 | 15 | 32 | 1.1 | 13–18 |
| 1.1 | 100 | 14 | 18 | 150 | dec | $5 \times 10^6$ | 11 | 25 | 1.0 | 22 | 50 | 1.9 | |
| 1.1 | 100 | 48 | 9 | 150 | dod | $2 \times 10^6$ | 5 | 10 | 0.3 | 10 | 18 | 0.4 | |
| 1.1 | 100 | 21 | 25 | 150 | dod | $2 \times 10^6$ | 12 | 25 | 0.8 | 25 | 48 | 1.6 | 19–24 |
| 1.1 | 100 | 15 | 40 | 150 | dod | $2 \times 10^6$ | 21 | 42 | 1.3 | 43 | 90 | 2.9 | |
| 1.1 | 100 | 51 | 20 | 150 | par | $2 \times 10^{-6}$ | 6 | 10 | 0.3 | 10 | 22 | 0.5 | 25–28 |
| 1.1 | 100 | 24 | 50 | 150 | par | $2 \times 10^6$ | 11 | 20 | 0.3 | 25 | 48 | 1.4 | |
| 0.6 | 100 | 54 | 1 | 150 | dec | $2 \times 10^6$ | 4 | 10 | 0.3 | 10 | 18 | 0.6 | |
| 0.6 | 100 | 28 | 3 | 150 | dec | $2 \times 10^6$ | 11 | 23 | 0.7 | 24 | 58 | 1.4 | 29–34 |
| 0.6 | 100 | 13 | 8 | 150 | dec | $2 \times 10^6$ | 20 | 43 | 1.3 | 42 | 102 | 3.0 | |
| TABLE B OF EXAMPLE IX (Experiments 35–54) (ALL WITHOUT DRAWDOWN) | | | | | | | | | | | | | |
| 2.1 | 100 | 50 | 5 | 150 | dec | $2 \times 10^6$ | 3 | 10 | 0.3 | 8 | 20 | 0.5 | |
| 2.1 | 100 | 25 | 23 | 150 | dec | $2 \times 10^6$ | 10 | 19 | 0.5 | 15 | 33 | 1.0 | 35–40 |
| 2.1 | 100 | 14 | 56 | 150 | dec | $2 \times 10^6$ | 18 | 36 | 1.1 | 35 | 75 | 2.3 | |
| 1.1 | 100 | 52 | 7 | 120 | dec | $2 \times 10^6$ | 6 | 15 | 0.4 | 12 | 25 | 0.8 | |
| 1.1 | 100 | 24 | 40 | 120 | dec | $2 \times 10^6$ | 11 | 25 | 0.7 | 24 | 50 | 1.5 | 41–46 |
| 1.1 | 100 | 13 | 92 | 120 | dec | $2 \times 10^6$ | 20 | 44 | 1.2 | 42 | 94 | 2.4 | |
| 1.4 | 50 | 24 | 6 | 150 | dec | $2 \times 10^6$ | 10 | 25 | 0.7 | 26 | 60 | 1.5 | |
| 1.4 | 50 | 13 | 16 | 150 | dec | $2 \times 10^6$ | 21 | 45 | 1.3 | 44 | 102 | 2.9 | Fiber 47–54 |
| 1.6 | 25 | 18 | 5 | 150 | dec | $2 \times 10^6$ | 12 | 25 | 0.6 | 28 | 52 | 1.4 | |
| 1.6 | 25 | 14 | 13 | 150 | dec | $2 \times 10^6$ | 22 | 48 | 1.6 | 46 | 96 | 2.9 | |

| Definition of Symbols For Table IX | Units |
|---|---|
| d = Extruded film thickness/fibre diameter | [mm] |
| $D_1$ = Polymer concentration, prior to swelling | [%] |
| $D_2$ = Polymer concentration, after swelling | [%] |
| ts = Swelling time (residence time) | [min] |
| Ts = Swelling temperature | [°C.] |
| Mw = Weight average molecular weight | [gr.mol$^{-1}$] |
| $g_1$ = Max draw ratio at 110° C. (one step) | |
| $g_2$ = Max draw ratio at 110°-140° C. temp. gradiant (multi-step) | |
| $E_1$, $E_2$ = Young's modulus (room temperature) | [GPa] |
| st$_1$, st$_2$ = tensile strength (room temperature) | [GPa] |
| *dec = decaline; par = paraffin oil; dod = dodecane | |

What is claimed is:

1. A process for preparing highly stretchable gel articles comprising:
   contacting an initial shaped article, comprising a polyolefin having a weight-average molecular weight of at least $4 \times 10^5$, with a swelling agent, at a temperature above the dissolving temperature of the polyolefin and below the temperature at which the polyolefin or the swelling agent decompose and for a length of time (t), expressed in minutes, wherein t is between about $0.1D^2$ and about $100D^2$, where D represents the thickness or diameter of the article in millimeters, to produce a swollen article containing about 60% to about 99% by weight swelling agent;

and thereafter cooling said swollen article to a temperature below the gelling temperature of the polyolefin to produce the gel article.

2. The process of claim 1, wherein said swollen article contains about 75% to about 95% by weight of swelling agent.

3. The process of claim 1, wherein t is from about 0.01 to about 10 minutes.

4. The process according to claim 1, wherein said initial shaped polyolefin article is contacted with the swelling agent at a temperature of about 75° C. to about 220° C.

5. The process according to claim 1, wherein the swelling agent is a lower alkane in the vapor phase.

6. The process according to claim 1, wherein the swelling agent is decalin, xylene, tetralin or trichlorobenzene.

7. The process according to claim 1, wherein said initial shaped article is obtained by extrusion, pressure forming or sintering of a melted or particulate polyolefin.

8. The process according to claim 1, wherein said initial shaped article contains solvent and is obtained by converting a suspension of a polyolefin in a solvent at elevated temperature to a homogeneous solution by using a screw extruder having conveying and kneading means and which thereby forms the solvent-containing article.

9. The process according to claim 1, wherein said initial shaped article is a polyolefin gel formed by a proceeding thermoreversible gelling process, comprising converting a solution of a high-molecular weight polyolefin and solvent to a solvent-containing article and cooling said article to form a gel, and substantially liberating the solvent from the gel article.

10. The process of claim 1, wherein the initial shaped article is subjected to partial stretching prior to contact with the swelling agent.

11. A process for preparing polyolefin articles having a high tensile strength and modulus which comprises:

contacting an initial shaped article, comprising a polyolefin having a weight-average molecular weight of at least $4 \times 10^5$, with a swelling agent at a temperature above the dissolving temperature of the polyolefin and below the temperature at which the polyolefin or the swelling agent decompose and for a length of time (t), expressed in minutes, of between about $0.1D^2$ and about $100D^2$, where D represents the thickness or diameter of the article in millimeters; to produce a swollen article containing about 60% to about 99% by weight of a swelling agent; and cooling said swollen article to a temperature below the gelling temperature of the polyolefin to produce the gel article; and thereafter stretching said gel article at an elevated temperature to form said polyolefin article having high tensile strength and modulus.

* * * * *

UNITED STATES PATENT AND TRADEMARK OFFICE
CERTIFICATE OF CORRECTION

PATENT NO. : 4,938,911

DATED : July 3, 1990

INVENTOR(S) : BASTIAANSEN et al.

It is certified that error appears in the above-identified patent and that said Letters Patent is hereby corrected as shown below:

Column 7, line 10, replace "deration" with --deaeration--;

line 15, replace "film" with --firm--; and lines 37 and 38, replace "410 and" with --was--.

Column 8, line 34, replace "tensible" with --tensile--.

Columns 9 and 10, Table A, column $D_2$, line 2, replace "25" with --26--;

Table A, column $M_w$, line 13, replace "$2 \times 10^{-6}$" with --$2 \times 10^6$--;

Table A, column $st_1$, line 14, replace "0.3" with --0.8--;

Table A, column $E_2$, line 16, replace "58" with --50--; and

UNITED STATES PATENT AND TRADEMARK OFFICE
CERTIFICATE OF CORRECTION

PATENT NO. : 4,938,911

DATED : July 3, 1990

INVENTOR(S) : BASTIAANSEN et al.

It is certified that error appears in the above-identified patent and that said Letters Patent is hereby corrected as shown below:

Columns 9 and 10, in the subscript of Table B (Definition of Symbols for Table IX), line 9, replace "gradiant" with --gradient--.

Signed and Sealed this

Twenty-eighth Day of July, 1992

*Attest:*

DOUGLAS B. COMER

*Attesting Officer*  *Acting Commissioner of Patents and Trademarks*